United States Patent Office 3,187,029
Patented June 1, 1965

3,187,029
4,4'-BIS-(DIMETHYLSILYL)PHENYL ETHER CYCLODISILOXANE
George M. Omietanski, Tonawanda, N.Y., assignor to Union Carbide Corporation, a corporation of New York
No Drawing. Filed Sept. 29, 1961, Ser. No. 141,624
1 Claim. (Cl. 260—448.2)

This invention relates to a novel disiloxane. More particularly, this invention relates to the novel cyclic siloxane, 4,4'-bis-(dimethylsilyl)phenyl ether cyclodisiloxane, having the formula

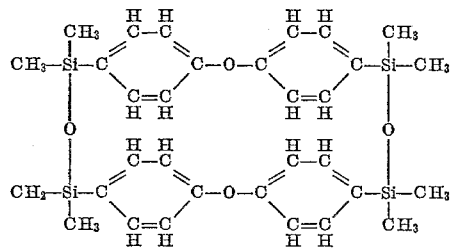

The above 4,4'-bis-(dimethylsilyl)phenyl ether cyclodisiloxane can be prepared by the acid catalyzed hydrolysis and/or condensation of organosilanes of the formula

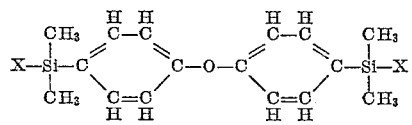

wherein X is a hydrolyzable group or a hydroxy group. Illustrative of the hydrolyzable groups which are represented by X are for example, halogen, such as chlorine, fluorine, bromine, and the like; alkoxy groups, such as, methoxy, ethoxy, propoxy, heptoxy, undecyloxy and the like; aryloxy groups, such as, phenoxy, naphthoxy and the like; and acyloxy groups, such as, acetoxy, propionoxy, butyroxy and the like.

The 4,4'-bis-(dimethylsilyl)phenyl ether cyclodisiloxane is useful in the preparation of modified silicone oils, resins and gums by basic equilibration according to standard procedures employed in the art. The bis-(dimethylsilyl)phenyl ether cyclodisiloxane is particularly useful in the preparation of high molecular weight copolymeric siloxanes which contain in addition to the 4,4'-bis-(dimethylsilyl)phenyl ether siloxane units, either phenyl methyl siloxane units or diphenylsiloxane units, by basic equilibration. These phenyl containing copolymers can not normally be prepared by the hydrolysis of the silanes and basic condensation of the hydrolysis products due to cleavage of the silicon-bonded phenyl groups in a basic medium when water is present. The copolymeric gums can be milled with silica fillers and cured to elastomers employing peroxide catalysts, such as dibenzoyl peroxide.

Preparations 1, 2 and 3 are illustrative of the methods which can be employed to produce the starting silanes.

PREPARATION 1

In a 5-liter pyrex glass flask equipped with a stirrer, addition funnel, reflux condenser and a means for maintaining an inert atmosphere, was placed 97 grams (4 grams-atoms) of magnesium turnings. A solution of 592 grams (4 moles) of dimethyldiethoxysilane in 1.2 liters of anhydrous tetrahydrofuran was prepared and an amount of this solution sufficient to just cover the magnesium turnings in the flask was added to the flask. Approximately 50 ml. of a solution of 4,4'-dibromophenyl ether (500 grams, 1.5 moles) in one liter of tetrahydrofuran was then added to the flask. To initiate the reaction 10 grams of p-dibromo-benzene was added and the mixture heated to reflux. The remainder of the dimethyldiethoxysilane-tetrahydrofuran solution was then added, followed by the dropwise addition of the remaining 4,4'-dibromophenyl ether solution over a 2 hour period. The reaction was mildly exothermic and during the addition became self-sustaining. After the addition was completed, the mixture was maintained at reflux for an additional 3.5 hours. The reaction mixture was cooled, filtered, stripped of solvent, and refiltered. Fractionation of the filtrate yielded 319 grams of 4,4'-bis(dimethylethoxysilyl)phenyl ether, B.P. 176° C./mm.; $n_D^{25}=1.5176$. Analysis of the compound gave the following results:

Calculated for $C_{20}H_{30}O_3Si_2$: 64.1% C; 8.1% H; 15.0% Si. Found: 64.3% C; 8.3% H; 15.0% Si.

PREPARATION 2

In a 500 ml. flask equipped with a thermometer well, was placed 205 grams (0.55 mole) of 4,4'-bis(dimethylethoxysilyl)phenyl ether and 60 grams (0.42 mole) of boron trifluoride etherate. The homogeneous mixture was heated until it reached 200° C.; during this time the volatile by-products were removed. Fractionation of the reaction mixture gave 157 grams of 4,4'-bis(dimethylfluorosilyl)phenyl ether.

B.P. 145–146° C./0.7 mm. Hg $n_D^{25}=1.5176$.

Analysis of the compound gave the following results:
Calculated for $C_{16}H_{20}F_2OSi_2$: 59.6% C; 6.3% H; 17.4% Si. Found: 59.5% C; 6.2% H; 17.4% Si.

PREPARATION 3

A solution of 20 ml. of 4,4'-bis(dimethylfluorosilyl)phenyl ether in 250 ml. of benzene was shaken in a quart bottle with 200 ml. of ice water and 100 ml. of concentrated ammonium hydroxide for 48 hours. The organic layer was separated, stripped of benzene by vacuum evaporation, yielding a residue which was redissolved in diethyl ether, filtered, and the ether was removed by vacuum evaporation. An extremely viscous fluid was obtained which crystallized upon standing. The solid, crystalline material was identified as 4,4'-bis(dimethylhydroxysilyl)phenyl ether and melted with decomposition at 85–91° C. Analysis of this material gave the following results:

Calculated for $C_{16}H_{20}O_3Si_2$: 60.4% C; 7.0% H; 17.6% Si. Found: 61.0% C; 7.1% H; 17.9% Si.

When methylcyclohexane is used as the solvent for the hydrolysis, the diol is obtained in crystalline form directly; however, the crystals apparently contain methylcyclohexane as part of the crystalline structure.

The following examples serve to further illustrate the invention.

Example 1

Solutions of 4,4'-bis(dimethylethoxysilyl)phenyl ether in acetone were prepared and placed in a series of stoppered 250 ml. Erlenmeyer flasks. Distilled water was added to these solutions at ambient temperatures until the cloud point was reached. Then, 2 drops of concentrated hydrochloric acid were added to each flask and with gentle swirling the solutions became clear. The solutions were allowed to stand for 17 hours during which time 4,4'-bis(dimethylsilyl)phenyl ether cyclodisiloxane precipitated. The 4,4'-bis-(dimethylsilyl)phenyl ether cyclodisiloxane was filtered and air dried at room temperature. This data is summarized in the following tabulation:

| Experiment Number | Weight of A[1] (g.) | Weight of Acetone (g.) | Weight of Water (g.) | Weight of Product[2] (g.) | Mole-Percent Yield |
|---|---|---|---|---|---|
| 1 | 10 | 122 | 44 | 5.0 | 59 |
| 2 | 10 | 102 | 35 | 4.5 | 53 |
| 3 | 10 | 82 | 25 | 4.0 | 47 |
| 4 | 10 | 64 | 18 | 3.5 | 41 |
| 5 | 10 | 108 | 3 | 1.5 | 18 |

[1] 4,4'-bis-(dimethylethoxysilyl)phenyl ether.
[2] 4,4'-bis-(dimethylsilyl)phenyl ether cyclodisiloxane.

Recrystallization of the 4,4'-(dimethylsilyl)phenyl ether cyclodisiloxane from acetone-water gave a material with a melting point of 193–194° C. Infra-red analysis confirmed the material to be 4,4'-bis-(dimethylsilyl)phenyl ether cyclodisiloxane. The 4,4'-bis-(dimethylsilyl)phenyl ether cyclodisiloxane gave the following analysis:

Calculated for $C_{32}H_{40}O_4Si_4$: 63.9% C; 6.7% H; 18.7% Si, 600 mol. wt. Found: 63.9% C; 6.7% H; 18.4% Si, 607 mol. wt.

Example 2

4,4'-bis(dimethylhydroxysilyl)phenyl ether was dissolved in acetone, water was added to the cloud point, followed by acidification with a few drops of concentrated hydrochloric acid, and the acidified solution allowed to stand at room temperature. Crystals of the disiloxane began to separate in about 15 minutes. The 4,4'-bis(dimethylsilyl)phenyl ether cyclodisiloxane had the same properties as those given in Example 1.

Example 3

Neopentyl glycol (0.50 mole) and 4,4'-bis(dimethylethoxysilyl)phenyl ether (0.442 mole) were mixed and heated to 250° C. until ethyl alcohol was no longer evolved, to yield a polymer which was soluble in acetone, benzene and toluene. The polymer had a viscosity at 25° C. of over 100,000 centipoises.

A solution of this polymer in acidified, aqueous acetone yielded 4,4'-bis(dimethylsilyl)phenyl ether cyclodisiloxane on standing at room temperature as a precipitate.

Example 4

In a small glass kettle were placed 32.8 grams of 4,4'-bis(dimethylsilyl)phenyl ether cyclodisiloxane, 67.2 grams of tetraphenyltetramethyl-cyclo tetrasiloxane, and 20 grams of octamethylcyclotetrasiloxane. The mixture was heated to 150–155° C. and sufficient cesium hydroxide was added so that the mixture contained 250 parts cesium per million parts of the siloxanes. The siloxanes were maintained at 150–155° C. for 4 hours. The mixture was then placed under reduced pressure (1 mm. Hg) and heated for an additional hour at 150° C. to yield 118 grams of a clear, tough copolymeric polysiloxane gum stock, which had a miniature penetrometer reading of 44 1/10 mm. per 10 seconds.

The copolymeric polysiloxane gum stock was milled on a 2 roll differential speed rubber mill according to standard techniques to yield a gum compound of the following recipe:

| | Parts by weight |
|---|---|
| Gum | 100 |
| Finely divided silica | 30 |
| Siloxane oil [1] | 10 |
| Ferric oxide | 2 |
| Catalyst [2] | 4 |

[1] A hydroxy end-blocked dimethylsiloxane fluid having the average formula, $HO[(CH_3)_2SiO]_xH$, where $(x)$ has a value from 15 to 25.
[2] A mixture of 50 parts by weight dibenzoyl peroxide and 50 parts by weight of a dimethylpolysiloxane oil.

The gum compound was then mold-cured for 15 minutes at 250° F. to yield an elastomer having the following properties:

| | As Cured | After 24 Hours at 250° C. |
|---|---|---|
| Tensile, p.s.i. | 480 | 790 |
| Elongation, percent | 250 | 200 |
| Hardness (Shore A) | 31 | 57 |
| Set at Break | 0 | 2 |

Example 5

Octamethyl cyclotetrasiloxane (128 grams), 4,4'-bis(dimethylsilyl)phenyl ether disiloxane (68 grams) and sufficient potassium dimethylsilanolate (3% by weight potassium) to form a mixture containing 60 parts potassium per million parts of the siloxanes were charged into a glass reaction vessel. The vessel and contents were heated at 150° C. for 72 hours to yield an opaque polysiloxane gum composed of dimethylsiloxane units and $$-\underset{\underset{CH_3}{|}}{\overset{\overset{CH_3}{|}}{Si}}-C_6H_4-O-C_6H_4-\underset{\underset{CH_3}{|}}{\overset{\overset{CH_3}{|}}{Si}}-O-$$

units.

The gum was then milled on a 2 roll rubber mill to give a siloxane gum compound of the following recipe:

| | Parts by weight |
|---|---|
| Gum | 100 |
| Finely divided silica | 40 |
| Siloxane oil [1] | 10 |
| Ferric oxide | 2 |
| Catalyst [2] | 4 |

[1] A hydroxy end-blocked dimethylsiloxane fluid having the average formula, $HO[(CH_3)_2SiO]_xH$, where $(x)$ has a value from 15 to 25.
[2] A mixture of 50 parts by weight dibenzoyl peroxide and 50 parts by weight of a dimethylpolysiloxane oil.

The siloxane gum compound was stored at room temperature, replasticized on the rubber mill and then mold-cured for 15 minutes at 250° F. to yield an elastomer having the following properties:

| | As Cured | After 24 Hours at 250° C. |
|---|---|---|
| Tensile, p.s.i. | 570 | 550 |
| Elongation, percent | 150 | 70 |
| Hardness (Shore A) | 63 | 66 |
| Set at Break, percent | 0 | 0 |

What is claimed is:

4,4'-bis(dimethylsilyl)phenyl ether cyclodisiloxane having the formula:

$$\begin{array}{c}
CH_3 \\
| \\
CH_3-Si-C_6H_3=C_6H_3-O-C_6H_3=C_6H_3-Si-CH_3 \\
| \\
O \\
| \\
CH_3-Si-C_6H_3=C_6H_3-O-C_6H_3=C_6H_3-Si-CH_3 \\
| \\
CH_3
\end{array}$$

References Cited by the Examiner

UNITED STATES PATENTS 2,582,799    1/52    Sauer _____ 260—448.2

OTHER REFERENCES

Baum: "Jour. of Organic Chemistry," vol. 23, March 1958, pages 480–1.

TOBIAS E. LEVOW, *Primary Examiner.*

ALPHONSO D. SULLIVAN, *Examiner.*